United States Patent [19]
Nichols et al.

[11] Patent Number: 5,633,331
[45] Date of Patent: May 27, 1997

[54] BLENDS OF POLYSULFONE WITH DIARYL FLUORENE CARBONATE POLYMER

[75] Inventors: Kevin L. Nichols, Lake Jackson, Tex.;
Paul J. Moses, Midland, Mich.; Mark F. Sonnenschein, Midland, Mich.;
Deborah E. Player, Midland, Mich.

[73] Assignee: The Dow Chemical Company, Midland, Mich.

[21] Appl. No.: 641,984

[22] Filed: May 2, 1996

[51] Int. Cl.⁶ .............................. C08L 69/00; C08L 81/06
[52] U.S. Cl. .............................. 525/462; 525/469
[58] Field of Search ........................... 525/462, 469

[56] References Cited

U.S. PATENT DOCUMENTS

| | | |
|---|---|---|
| 3,365,517 | 1/1968 | Barth . |
| 4,152,367 | 5/1979 | Binsack .................. 525/462 |
| 5,486,577 | 1/1996 | Farah ..................... 525/469 |

FOREIGN PATENT DOCUMENTS

| | | | |
|---|---|---|---|
| 000733 | 2/1979 | European Pat. Off. | ............. 525/462 |
| 026006 | 1/1995 | Japan . | |

*Primary Examiner*—David Buttner

[57] ABSTRACT

Polymer blend compositions are prepared having excellent combinations of optical properties, physical properties and hydrolytic stability comprising, in admixture, (a) a diaryl fluorene carbonate polymer and (b) a polysulfone. Preferably, the diaryl carbonate polymer is a copolycarbonate of bisphenol A with bis(hydroxyphenyl) fluorene, preferably 9,9-bis(4-hydroxyphenyl) fluorene. Optionally, the blend compositions also comprise a second non-fluorene carbonate polymer (c). Preferably, the polysulfone is a bisphenol A polysulfone or a polyether poly sulfone. In preferred aspects of this invention, the polysulfone and diaryl carbonate polymer components are selected to provide a transparent blend composition.

16 Claims, No Drawings

BLENDS OF POLYSULFONE WITH DIARYL FLUORENE CARBONATE POLYMER

FIELD OF THE INVENTION

This invention relates to blend compositions containing carbonate and sulfone polymers and to a method of improving the transparency of an article molded from a polycarbonate/polysulfone blend.

BACKGROUND OF THE INVENTION

Blends compositions have been produced by blending polysulfones with polycarbonates. See for example U.S. Pat. No. 3,365,517. The polycarbonates used in these blends were generally prepared from dihydroxy compounds in which hydroxy-substituted aromatic rings are typically bridged by an alkylene or alkylidene radical. Bisphenol-A is the primary example of such a conventional bisphenol. While polycarbonates were recognized to provide molded articles with desirable combinations of physical and optical properties, the polysulfone imparted a superior level of rigidity, hydrolytic stability and heat resistance to such articles. The blends according to U.S. Pat. No. 3,365,517 were not, however, transparent and it would be desired to provide molded articles with improved combinations of transparency and physical properties.

It is also known that copolymers can be prepared comprising carbonate and sulfone moieties. In these copolymers a range of dihydroxy compounds have been employed including fluorene-bridged aromatic dihydroxy compounds. See for example Japanese Patent Publication JP 05-163,350. These polymers are taught to have good combinations of properties, including transparency, but require a different synthesis of an expensive new polysulfone copolymer for adjusting polymer properties.

It would be desirable to provide resins which, in the form of molded articles, have improved combinations of properties. In many applications, such as the medical field, it is extremely important for molded articles to have good transparency and hydrolytic stability in addition to other performance characteristics. It would accordingly be desirable to obtain compositions containing polycarbonate and polysulfone from which a transparent article could be molded having good combinations of impact resistance, ductility and hydrolytic stability.

SUMMARY OF THE INVENTION

According to the present invention there is provided a polymer blend composition comprising, in admixture, (a) a diaryl fluorene carbonate polymer and (b) a polysulfone. In another embodiment, the composition comprises (c) a second non-fluorene aromatic carbonate polymer prepared from a dihydroxy aryl compound. Preferably the diaryl fluorene carbonate polymer (a) is a copolymer prepared from a diaryl fluorene compound and a non-fluorene dihydroxy aryl compound. Preferably the diaryl fluorene compound used in the preparation of the diaryl fluorene carbonate polymer is represented by the structure generally as follows:

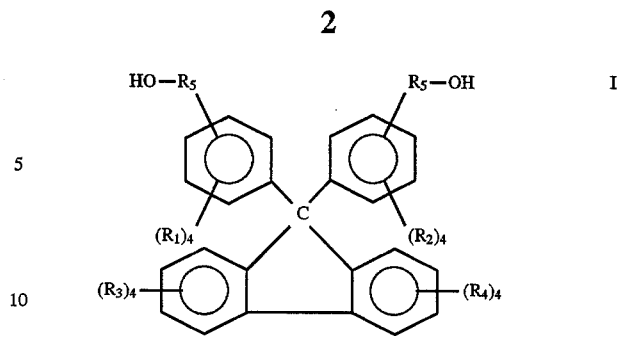

wherein $R_1$, $R_2$, $R_3$ and $R_4$ independently in each occurrence are hydrogen, a 1 to 6 carbon, linear, branched or cyclic alkyl, haloalkyl, alkoxy, aryl or aryloxy radical, or a halogen and $R_5$ is a divalent alkyl, haloalkyl, alkoxy, aryl or aryloxy radical comprising 1 to 12 carbon atoms, preferably 1 to 6 carbon atoms, or a single bond.

In one of the preferred aspects of the present invention, the diaryl fluorene carbonate polymer and polysulfone are selected to provide a refractive index match (preferably within about 0.01 unit of each other) and result in a transparent blend composition. In another preferred aspect of the present invention the ratio of moles of diaryl fluorene in diaryl fluorene carbonate polymer (a) per mole of non-fluorene-bridged dihydroxy compound used in carbonate polymers (a) and (c) is about 0.8:1 to about 3:1. In one embodiment the compositions according to the present invention comprise from about 1 to about 99 parts by weight carbonate polymer (a) and optional (c) and from about 1 to about 99 parts by weight polysulfone (b), with respect to 100 total parts by weight of these three components.

The preferred polysulfones have repeat units according to the formula:

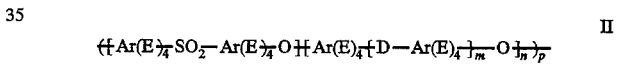

where Ar is a 6 to 20 carbon divalent aromatic radical; D is a single bond or a divalent hydrocarbyl radical composed of 1-10 carbon atoms, each E is independently hydrogen, a halogen, a $C_1$–$C_8$ alkyl, alkaryl, aralkyl, or aryl radical; m is 0 or 1; n is from 0 to about 3, and p is from about 1 to about 500. Using preferred compositions according to the present invention, transparent molded articles can be prepared.

The compositions of this invention are useful, for example, in the production of molded or shaped articles of all sorts including but not limited to films, fibers, extruded sheets or profiles, multi-layer laminates and especially the injection molding of a broad range of shaped articles including sterilizable medical articles, data storage apparatus and media, appliance and instrument housings, motor vehicle body panels and other parts and components for use in the automotive, electrical and electronics industries. The methods of this invention are useful for preparing compositions and molded articles having applications which are the same as or similar to the foregoing.

DETAILED DESCRIPTION OF THE INVENTION

The compositions of this invention are those in which (a) a polycarbonate comprising a diaryl fluorene moiety, preferably prepared from a dihydroxyaryl compound, has been admixed in a polymeric blend with (b) a polysulfone (as these components are more fully defined below). As will also be discussed, one or more optional components may be incorporated in these blend formulations, including: (c) a second, non-fluorene aromatic carbonate polymer, (d) a polyester, (e) a styrenic copolymer, and (f) an elastomeric impact modifier.

Component (a) in the compositions of this invention is a diaryl fluorene carbonate polymer containing (in addition to the carbonate polymer precursor moieties) diaryl fluorene moieties and, optionally, additional diaryl moieties which do not contain a fluorene moiety. The diaryl fluorene moieties are also referred to as "fluorene-bridged aromatic moieties". The diaryl fluorene carbonate polymer is typically prepared from a dihydroxy aryl fluorene compound, preferably having hydroxy-substituted aromatic rings bridged by a fluorene radical, optionally, one or more additional dihydroxy aryl compounds in which hydroxy-substituted aromatic rings are not bridged by a fluorene radical and a carbonate polymer precursor compound. An example of a preferred dihydroxy aryl fluorene compound (also referred to as a "fluorene-bridged aromatic dihydroxy compound") is 9,9-bis (hydroxyphenyl) fluorene ("BHPF"). The diaryl fluorene carbonate polymer is preferably a copolymer comprising additional diaryl moieties which do not contain a fluorene moiety ("non-fluorene-bridged aromatic moieties") and is preferably prepared from one or more additional dihydroxy aryl compounds in which hydroxy-substituted aromatic rings are not bridged by a fluorene radical (i.e., "non-fluorene-bridged aromatic dihydroxy compounds"). Bisphenol-A is a preferred non-fluorene-bridged aromatic dihydroxy compound for use in preparing a dihydroxy aryl fluorene copolymer.

Diaryl fluorene carbonate polymers are characterized by containing polymerized therein (in addition to carbonate precursor remnant units) moieties of one or more diaryl fluorene represented by the general formula below:

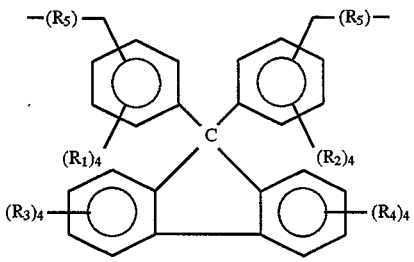

III wherein $R_1$, $R_2$, $R_3$ and $R_4$ independently in each occurrence are hydrogen, a 1 to 12 carbon, preferably 1 to 6 carbon, linear, branched or cyclic alkyl, haloalkyl, alkoxy, aryl or aryloxy radical, such as methyl, ethyl, isopropyl, cyclopentyl, cyclohexyl, methoxy, ethoxy, benzyl, tolyl, xylyl, phenoxy and/or xylynoxy, or a halogen (such as fluorine, chlorine and/or bromine); $R_5$ is a divalent oxygen radical; or alkyl, haloalkyl, alkoxy, aryl or aryloxy radical comprising 1 to 12 carbon atoms, preferably 1 to 6 carbon atoms; or a single bond; the selection and position of these substituents being required to fill the available valences and be sterically compatible with each other and with the rest of the molecule. This means that these substituent groups will be located and have a spatial arrangement of their atoms permitted by their size.

These polymer moieties preferably result from and are remnants of the corresponding dihydroxy aryl fluorene compound which has been reacted with a carbonate polymer precursor (such as phosgene) in a carbonate-forming condensation polymerization reaction. Such dihydroxy aryl fluorene compounds are represented by the above formula with "—OH" at the appropriate valences.

In a preferred embodiment of the present invention (a) $R_1$, $R_2$, $R_3$ and $R_4$ are all hydrogen in each occurrence and $R_5$ is an oxygen (the dihydroxy aryl fluorene compound is 9,9-bis(hydroxyphenyl) fluorene, "BHPF") or (b) $R_3$ and $R_4$ are all hydrogen, one occurrence of each $R_1$ and $R_2$, preferably in the "3" position, is phenyl, and the rest of the $R_1$ and $R_2$ moieties are hydrogen, i.e., the dihydroxyaryl fluorene is preferably 9,9-bis (hydroxy-phenyl)phenyl fluorene ("BHPF"), more preferably, 9,9-bis (4-hydroxy-3-phenyl) phenyl fluorene. Preferably, the "-$R_5$-" moieties in the formula above are predominantly both positioned in the "4-" position, para to the bridging fluorene moiety.

In another preferred diaryl fluorene monomer/moiety for use in the present invention, $R_1$ and $R_2$ are bromine in two occurrences each, preferably in the 3 and 5 positions (the dihydroxy aryl fluorene compound is 9,9-bis(3,5-dibromo-4-hydroxyphenyl) fluorene). In another diaryl fluorene monomer/moiety suitable for use in the present invention, the dihydroxy aryl fluorene compound is an ethylene oxide derivative of BHPF where -$R_5$- is a divalent ethyoxy radical. These types of monomers/moieties are shown in WO 94/03521 and can be prepared by known techniques such as the reaction of BHPF with ethylene oxide or the reaction of fluorenone with an ethylene oxide derivative of phenol.

Methods of preparing dihydroxy aryl fluorene compounds such as BHPF from fluorenones and phenols are known, as set forth in Morgan, U.S. Pat. No. 3,546,165. Other diaryl fluorene multihydric compounds can similarly be prepared from fluorenone or substituted fluorenones and appropriate aromatic reactants.

To prepare a diaryl fluorene carbonate polymer for use as component (a) in the blends according to this invention, the polycarbonate backbone can comprise solely or 100 mole percent diaryl fluorene moieties (in addition to carbonate precursor remnant moieties) or can preferably comprise additional non-fluorene-bridged ("non-fluorene") aromatic moieties in a copolycarbonate. These non-fluorene moieties in a copolycarbonate preferably result from and are remnants of the corresponding non-fluorene dihydroxy aryl compound which has been reacted with the dihydroxy aryl fluorene compound and a carbonate polymer precursor (such as phosgene) in a carbonate-forming condensation reaction. These copolycarbonates may be segmented, block, random or alternating copolymers. Examples of non-fluorene-bridged dihydroxy compounds suitable for preparing the copolycarbonate of component (a) include various substituted or unsubstituted dihydroxyaryl compounds represented generally by the formula:

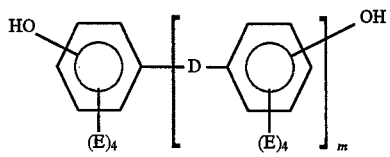

IV wherein: D is (a) a divalent radical, of which all or different portions can be (i) linear, branched, cyclic or bicyclic, (ii) aliphatic or aromatic, and/or (iii) saturated or unsaturated, said divalent radical being composed of 1–35 carbon atoms together with up to five oxygen, nitrogen, sulfur and/or halogen (such as fluorine, chlorine and/or bromine) atoms; or (b) a divalent S, $S_2$, SO, $SO_2$, O or CO radical; or (c) a single bond; each E is independently hydrogen, halogen (such as fluorine, chlorine and/or bromine), a $C_1$–$C_{12}$, preferably $C_1$–$C_8$, linear or cyclic alkyl, aryl, alkaryl, aralkyl, alkoxy or aryloxy radical, such as methyl, ethyl, isopropyl, cyclopentyl, cyclohexyl, methoxy, ethoxy, benzyl, tolyl, xylyl, phenoxy and/or xylynoxy; or a nitro or nitrile radical; and m is 0 or 1. These compounds provide the corresponding monoaryl (m is 0) or diaryl (m is 1) repeating moiety in the copolymeric diaryl fluorene polycarbonate. Such moieties in the copolymeric diaryl fluorene polycarbonate are represented by the above formula where "—OH" is replaced by "—O—".

For example, the bridging radical represented by D in the above formula can be a $C_2$-$C_{30}$ alkyl, cycloalkyl, alkylidene or cycloalkylidene radical, or two or more thereof connected by an aromatic or ether linkage, or can be a carbon atom to which is bonded one or more groups such as $CH_3$, $C_2H_5$, $C_3H_7$, n-$C_3H_7$, i-$C_3H_7$, cyclohexyl, bicyclo[2.2.1]heptyl, benzyl, $CF_2$, $CF_3$ $CCl_3$, $CF_2Cl$, CN, $(CH_2)_2COOCH_3$.

Representative examples of non-fluorene-bridged aromatic dihydroxy compounds of particular interest are: (a) the bis(hydroxyphenyl)alkanes, such as 2,2-bis-(4-hydroxyphenyl)-propane ("Bisphenol A"), 2,2-bis-(4-hydroxyphenyl)-pentane, 2,4'-dihydroxy diphenyl methane, bis-(2-hydroxyphenyl) methane, bis-(4-hydroxy-phenyl)-methane, 1,1-bis-(4-hydroxyphenyl)-ethane, 3,3-bis-(4-hydroxyphenyl)-pentane; (b) halogenated bis (hydroxyphenyl) alkanes such as 2,2-bis(3,5-dihalo-4-hydroxyphenyl)propane ("Tetrahalo Bisphenol-A") where the halogen can be fluorine, chlorine, bromine or iodine, such as for example 2,2-bis(3,5-dibromo-4-hydroxyphenyl) propane ("Tetrabromo Bisphenol-A" or "TBBA"); (c) alkylated bis(hydroxyphenyl)alkanes such as 2,2-bis(3,5-dialkyl-4-hydroxyphenyl) propane ("Tetraalkyl Bisphenol-A") where the alkyl can be methyl or ethyl, for example 2,2-bis(3,5-dimethyl-4-hydroxyphenyl) propane ("Tetramethyl Bisphenol-A"); (d) other ring-substituted bis (hydroxyphenyl)alkanes such as bis(4-hydroxy-5-nitrophenyl)-methane; (e) bis(hydroxyphenyl) aryl-substituted alkanes such as 1-bis(4-hydroxyphenyl)-1-phenyl ethane ("Bisphenol-AP" or "Bis-AP"); (f) bis (hydroxyphenyl) cycloalkanes such as 1,1-bis(4-hydroxyphenyl)cyclohexane; (g) dihydroxyphenyls such as hydroquinone and resorcinol; (h) the dihydroxydiphenyls such as 2,2'-dihydroxydi-phenyl and 2,6-dihydroxy naphthalene; (i) the bis(hydroxyphenyl)-sulfones such as bis-(4-hydroxyphenyl) sulfone; 2,4'dihydroxydiphenyl sulfone, 5'-chloro-2,4'-dihydroxy-diphenyl sulfone, bis-(4-hydroxyphenyl) diphenyl disulfone, and (j) the dihdroxydiphenyl ethers such as 4,4'-dihydroxydiphenyl ether, 4,4'-dihydroxy-3,3'-dichloro diphenyl ether, and 4,4'-dihydroxy-2,5-diethoxydiphenyl ether. However, other suitable conventional dihydroxy aryl compounds are known and disclosed in the literature relating to polycarbonate production. As mentioned above, the preferred dihydroxy aryl compound for copolycarbonate formation with a dihydroxy aryl fluorene compound is 2,2-bis(4-hydroxyphenyl) propane ("Bisphenol-A").

It has also been found to be desirable to incorporate in (or in addition to) the diaryl fluorene carbonate polymer component an amount of (c) another aromatic polycarbonate that is preferably miscible with the diaryl fluorene carbonate polymer. In U.S. Pat. No. 5,486,577 and JP 07-026,132-A blends of diaryl fluorene carbonate polymers with other aromatic polycarbonates are described. In terms of readily and cost effectively obtaining a desired mole percentage of diaryl fluorene moieties in the diaryl fluorene carbonate polymer component (discussed further below), it may be preferred to use a miscible aromatic polycarbonate component (c), preferably in the form of a "blend" or "alloy" diaryl fluorene carbonate polymer with component (a) in the blends according to the present invention. In general, the aromatic polycarbonates (c) suitable for use are known and commercially available, particularly in the case of the wide range of bisphenol A polycarbonate resins.

As can be seen, the weight ratios of (a) and optional (c) in the claimed blends can range widely depending upon the amount of diaryl fluorene moiety desired in the final blend composition and the concentration in the particular component (a) that is available. In general, based on total amount of (a) plus (c), if (c) is employed, it is used in amounts of at least about 1, preferably at least about 10, and more preferably at least about 70 weight percent and up to about 99, preferably about 90 and more preferably about 80 weight percent.

The ratio of the amount of diaryl fluorene moieties to non-fluorene aryl moieties in a copolycarbonate component (a) or a blend of (a) with optional component (c) may be expressed as moles of diaryl fluorene moiety (whether of one or more kinds) per mole of non-fluorene aryl moiety in components (a) and optionally (c), whether of one or more kinds, and not including any moles of non-aromatic carbonate precursor moieties. In the case of copolymeric diaryl fluorene carbonate polymer components, this ratio will typically be determined by the ratio at which the corresponding dihydroxy compounds are employed in an interfacial-type polymerization process. Where optional component (c) is incorporated, this ratio of fluorene to non-fluorene moieties should consider the non-fluorene moieties in component (c), as well.

Desirably, in blends according to the present invention having a good balance of physical and optical properties, it has been found that that this ratio should preferably be at least about 0.1:1; more preferably at least about 0.25:1, more preferably at least about 0.4:1, still more preferably at least about 0.6:1 and most preferably at about 0.8:1. Desirably this ratio should be less than or equal to about 100:1, preferably less than or equal to about 10:1, more preferably less than or equal to about 4:1, still more preferably less than or equal to about 3:1 and most preferably less than or equal to about 1.5:1.

Among other factors that affect the selection of the mole ratio of diaryl fluorene to the non-fluorene aryl compounds/moieties in components (a) plus optional (c), are the desired heat resistance of the resulting resin and the refractive index of the carbonate polymer component needed to match or nearly match the polysulfone component refractive index in attempting to provide transparency.

As used herein, unless specifically stated to be otherwise, the term molecular weight refers to the weight average molecular weight of the carbonate polymer as determined by light scattering or gel permeation chromatography. In general, the diaryl fluorene carbonate polymers suitable for use in the blends according to the present invention preferably have (i) a weight average molecular weight, as determined by light scattering or gel permeation chromatography, of about 5,000 to about 250,000, preferably about 15,000 to about 100,000, and more preferably about 18,000 to about 45,000; and (ii) a polydispersity (weight average molecular weight divided by number average molecular weight) of from 2 to about 3.2, preferably to about 2.8, more preferably to about 2.6 and most preferably to about 2.3.

As recognized by those skilled in the art, molecular weight can be controlled in these polymers by known techniques including the use of monofunctional chain terminating compounds employed in amounts depending primarily upon the molecular weight and degree of branching desired. The typical types of monofunctional chain terminating agents include monofunctional substances such as phenols, alcohols, amines, imides, carbonic acid chlorides, sulfonic acid chlorides, benzyltriethyl ammonium chloride, or phenylchlorocarbonates. Chain terminator may be added to the reaction mixture before or after a dihydroxy compound is contacted with a carbonate precursor, and is typically used in an amount of about 0.01 to 0.1 moles per mole of dihydroxy compound. Preferred chain terminating compounds include the monophenols containing at least one aromatic ring optionally having at least one alkyl radical having one to ten carbon substituted on an aromatic ring and/or, in the case of multiple aromatic rings, linking the rings. Preferred monofunctional chain terminating compounds include but are not limited to phenol, cresol, p-tert.-butylphenol, cumylphenol, and bromophenol. The improved process of this invention also allows the use of carboxylic acids as chain terminators. Preferred carboxylic acid terminators contain at least one alkyl radical having one to 25 carbon atoms and/or at least one aromatic ring which can be optionally substituted with from one to ten carbon atoms linked to the carboxylic acid group. These preferred carboxylic acid terminators include but are not limited to the straight chain aliphatic carboxylic acid series from acetic acid through and including stearic acid, phenylacetic acid, and benzoic acid. Various mixtures of chain terminators can also be employed in the compositions and process of this invention.

Preferably the polymer is prepared and the molecular weight is controlled in a fashion to reduce the phenolic (—OH) end group content (as determined by the titanium chloride colorimetric method described in Horbach et al, Encyl. Ind. Chem. Anal., Vol. 17, pp. 329–352, Krieger, 1973) to less than about 500 ppm, preferably less than about 300 ppm, and more preferably less than about 150 ppm;

A branched rather than linear polycarbonate molecule can be obtained by adding to the reaction mixture a tri- or polyfunctional monomer such as a tri- or tetrafunctional phenol or carboxylic acid (or ester-forming derivative, such as an acyl halide or anhydride), a bisphenol containing carboxylic acid side groups, or a nitrogen-containing compound such as cyanuric chloride, or compounds containing a mixture of such groups. Preferred branching agents are based on trimellitic acid, pyromellitic dianhydride or 1,1,1-tris(4-hydroxyphenyl)ethane.

Also included within the diaryl fluorene-containing polycarbonates described herein are copolymers optionally prepared by incorporating into the polymerization reaction mixture a dicarboxylic acid, such as terephthalic acid or isophthalic acid (or an ester-forming derivative thereof such as the acid chloride), or a hydroxycarboxylic acid, from which a poly(ester/carbonate), a copolymer containing ester bonds or segments, is obtained. The ester precursor may be added to the reaction mixture as a monomer or as a separately-formed ester oligomer. An ester/carbonate copolymer may have, for example, about 15 to 90, preferably about 35 to 70, mole percent ester bonds. However, in a preferred embodiment, the diaryl fluorene carbonate copolymer of this invention does not contain any ester bonds or segments.

These dihydroxyaryl compounds (both fluorene- and non-fluorene-bridged) are reacted with a carbonate precursor such as a carbonic acid derivative, a haloformate or a carbonate ester to prepare the corresponding polycarbonate. These components are usually reacted by means of the phase boundary or interfacial process in which each dihydroxy compound is at least partially dissolved and partially deprotonated by aqueous base, and the carbonate precursor is dissolved by an organic solvent. The polymer is recovered from the reaction mixture by known means. It may be desired to prepare the pellets of the fluorene polymer component by extrusion under nitrogen or other means to exclude oxygen to avoid molecular weight degradation and coloration.

In general, depending upon the desired balance of properties, in order to obtain improved heat resistance properties, the blends according to the invention comprise the component (a) diaryl fluorene carbonate polymer and optional non-fluorene carbonate polymer (c) in amounts of at least about 1 weight part, desirably at least about 5 weight parts, preferably at least about 10 weight parts, more preferably at least about 20 weight parts and most preferably at least about 30 weight parts, based on the weight parts of components (a) and (b) and optional (c). In obtaining the desirable hydrolytic stability and ductility properties, the blends according to the invention comprise the component (a) diaryl fluorene carbonate polymer and optional non-fluorene carbonate polymer (c) in amounts of not more than about 99 weight parts, advantageously not more than about 98 weight parts, preferably not more than about 95 weight parts, more preferably not more than about 80 weight parts and most preferably not more than about 70 weight parts, based on the weight parts of components (a) and (b) and optional (c).

Component (b) in the compositions of this invention is a polysulfone, a generally clear, rigid thermoplastic with a glass transition temperature of about 180° to about 250° C. Polysulfones can be generally described as containing backbone aromatic rings which are linked, preferably para-linked, partly by sulfone groups(—SO$_2$—) and partly by dissimilar groups such as an ether or alkyl group or a single bond. In general, the repeating units of a polysulfone may be represented generally by structure as follows:

V where Ar is a 6 to 20 carbon aromatic radical, preferably phenylene; D is (a) a divalent radical, of which all or different portions can be (i) linear, branched, cyclic or bicyclic, (ii) aliphatic or aromatic, and/or (iii) saturated or unsaturated, said divalent radical being composed of 1–35 carbon atoms together with up to five oxygen, nitrogen, sulfur and/or halogen (such as fluorine, chlorine and/or bromine) atoms; or (b) a divalent S, S$_2$, SO, SO$_2$, O or CO radical; or (c) a single bond; each E is independently hydrogen, a halogen (such as fluorine, chlorine and/or bromine), a C$_1$–C$_{12}$, preferably C$_1$–C$_8$, linear or cyclic alkyl, aryl, alkaryl, aralkyl, alkoxy or aryloxy radical, such as methyl, ethyl, isopropyl, cyclopentyl, cyclohexyl, methoxy, ethoxy, benzyl, tolyl, xylyl, phenoxy and/or xylynoxy; or a nitro or nitrile radical; m is 0 or 1; and n is from 0 to about 3, and p is from about 1 to about 500.

Preferably D is a single bond or a divalent hydrocarbyl radical, preferably composed of 1–10 carbon atoms, and is preferably isopropylidene. Preferably each E is independently hydrogen, a halogen, a C$_1$–C$_8$ alkyl, alkaryl, aralkyl, or aryl radical.

In preferred polysulfones according to the formula above,

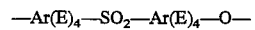
VI represents a remnant of a 4,4'-dihalodiphenyl sulfone (e.g., dichlorodiphenylsulfone) or a sulfone-bridged bisphenol (e.g., bisphenol S) and

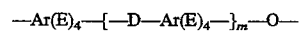
VII represents a remnant of an optional dihydric compound, preferably Bisphenol-A.

Preferred polysulfones are commonly prepared from a 4,4'-dihalodiphenyl sulfone and a second, optional dihydric compound, such as Bisphenol-A, in a dipolar aprotic solvent such as dimethyl sulfoxide or 1-methyl-2-pyrrolidinone. A fluoride or chloride may be used as the dihalodiphenyl sulfone monomer. Another variety of polysulfone is synthesized from a bisphenol which contains a sulfone bridge ("Bisphenol-S"). The polysulfone component used in the compositions is distinguished from a sulfone-containing polycarbonate in that such polysulfone does not contain carbonate moieties. Some examples of the suitable types of polysulfones that are commercially available are Victrex™ polyether polysulfone from ICI Americas, Inc.; Udel™ bisphenol A polysulfone from Amoco Performance Products, Inc.; Radel A™ polyarylethersulfone from Amoco Performance Products, Inc.; and Radel R™ polyphenylsulfone from Amoco Performance Products, Inc.

Other bisphenols in addition to Bisphenol-A, which can be used with the sulfone monomer to prepare polysulfone are 4,4'-dihydroxydiphenyl sulfide, 4,4'-dihydroxydiphenyl oxide, 4,4'-dihydroxydiphenylmethane, hydroquinone, bis (4-hydroxydiphenyl)-2,2-perfluoropropane, bis(4-hydroxydiphenyl)- 1,1-cyclohexane, 4,4'-dihydroxybenzophenone, and 4,4'-dihydroxydiphenyl.

In order to provide resulting transparent blends with the aryl fluorene carbonate polymer, it is desired that the polysulfone component have a composition that results in a refractive index of less than about 1.675, preferably less than about 1.670, more preferably less than about 1.666 and at least about 1.600, preferably at least about 1.610 and most preferably at least about 1.615 when measured at about 23° C.

The polysulfones suitable for use in the compositions according to the present invention desirably have a molecular weight (weight average) of at least about 10,000, preferably at least about 25,000, and more preferably at least about 35,000, and preferably up to about 200,000, more preferably up to about 100,000 and more preferably up to about 80,000. Suitable melt flow rates as measured in grams per 10 minutes by ASTM D1238, (343° C., 8.7 kg) range from at least about 1, preferably at least about 2, and more preferably at least about 3, up to about 30, more preferably up to about 20 and more preferably up to about 10.

In general, depending upon the desired balance of properties, in order to obtain improved hydrolytic stability and ductility the blends according to the invention comprise the component (b) polysulfone in amounts of at least about 5 weight parts, desirably at least about 20 weight parts, advantageously at least about 30 weight parts, preferably at least about 50 weight parts, more preferably at least about 70 weight parts, and most preferably at least about 80 weight parts, based on 100 weight parts of components (a), (b) and (c). In maintaining the desirable heat resistance, the blends according to the invention comprise the component (b) polysulfone in amounts of not more than about 99 weight parts, advantageously not more than about 98 weight parts, preferably not more than about 95 weight parts, more preferably not more than about and most preferably not more than about 70 weight parts, based on 100 weight parts of components (a), (b) and (c).

If desired to provide further improvement in the chemical resistance and flow properties of the blends according to the present invention and recognizing that the transparency may be detrimentally affected, an amount of an optional component (d) polyester can be included in the blends according to the present invention.

In general the component (d) polyester is incorporated in the blends according to the invention in amounts of at least about 5 weight parts, advantageously at least about 10 weight parts, preferably at least about 15 parts, and more preferably at least about 20 parts, based on the weight parts of components (a), (b), (c) and (d). In maintaining the desirable heat resistance, the blends according to the invention comprise the component (d) polyester in amounts of not more than about 75 weight parts, advantageously not more than about 55 weight parts, preferably not more than about 50 weight parts and most preferably not more than about 45 weight parts, based on the weight parts of components (a), (b), (c) and (d).

If desired to provide further improvement in the impact resistance and flow properties of the blends according to the present invention and recognizing that the transparency and heat resistance properties may be detrimentally affected, an amount of an optional component (e) styrenic polymer can be included in the blends according to the present invention. Component (e) styrenic polymers suitable for use in the compositions of this invention are well known to those skilled in the art and are commercially available. In general they are styrenic polymers prepared from one or more styrenic monomers and optionally one or more ethylenically unsaturated monomers copolymerizable with a styrenic monomer and may also contain minor amounts of an impact modifying elastomer or rubbery polymer, optionally grafted with a compatibilizing amount of styrenic (co)polymer, dispersed therein. Compared to the optional impact modifier mentioned below which may also comprise styrenic monomer(s), the optional styrenic polymer will have a Tg of at least 95° C., preferably at least 105° C.

In general the component (e) styrenic polymer is incorporated in the blends according to the invention in amounts of at least about 5 weight parts, advantageously at least about 10 weight parts, preferably at least about 15 parts, and more preferably at least about 20 parts, based on the weight parts of components (a), (b), (c) and (e). In maintaining the desirable heat resistance, the blends according to the invention comprise the component (d) styrenic polymer in amounts of not more than about 75 weight parts, advantageously not more than about 55 weight parts, preferably not more than about 50 weight parts and most preferably not more than about 45 weight parts, based on the weight parts of components (a), (b), (c) and (e).

If desired to provide further improvement in the impact resistance properties of the blends according to the present invention and recognizing that the transparency may be detrimentally affected, an amount of an optional component (f) impact modifier can be included in the blends according to the present invention. Optional component (f) impact modifiers suitable for use in the compositions of this invention are well known to those skilled in the art and are commercially available elastomeric or rubber polymers including, for example, elastomers such as a block copolymer, a core-shell grafted copolymer or mixtures thereof. Compared to the optional styrenic polymer mentioned below which may also comprise styrenic monomer (s), the optional styrenic polymer will have a Tg of less than about 0° C., preferably less than about –20° C.

In general the optional component (f) impact modifier is incorporated in the blends according to the invention in amounts of at least about 5 weight parts, advantageously at least about 10 weight parts, preferably at least about 15 parts, and more preferably at least about 20 parts, based on the weight parts of components (a), (b), (c)and (f). In maintaining the desirable heat resistance, the blends according to the invention comprise the optional component (f) impact modifier in amounts of not more than about 35 weight parts, advantageously not more than about 30 weight parts, preferably not more than about 25 weight parts and most preferably not more than about 20 weight parts, based on the weight parts of components (a), (b), (c) and (f).

The number of weight parts of the various components from which the compositions of this invention may be prepared may, but need not necessarily, total to 100 weight parts. Also included within this invention are the reaction products, if any, of the above named components when admixed in the compositions of this invention.

The compositions and methods of this invention involve the improvement of the combinations of desirable properties obtainable in molded or shaped articles including heat resistance, hydrolytic stability and transparency. These properties are obviously affected by the incorporation of any of the other optional components in the blend formulations.

Regarding transparency or light transmittance, one of the most desirable properties obtainable in these blends, transparency in a molded article may be measured as the "luminous transmittance" and described in terms of percentage or ratio of the light or luminous flux that is transmitted through a specimen to the light that is incident upon the surface. As used herein, transparency is said to exist when, according to ASTM D-1003-92, molded articles have a measured total light transmission value of at least about 40% (ratio of about 0.4), more preferably at least about 60% (ratio of about 0.6), and most preferably at least 75% (ratio of about 0.75).

Depending upon the particular polysulfone component selected and the temperature at which it is measured, the refractive index of a polysulfone is in the range of about 1.620 to about 1.680, the refractive index of homopolycarbonate based on BHPF as the diaryl fluorene is in the range of from about 1.635 to about 1.665 and that of a Bisphenol-A polycarbonate is in the range of about 1.580 to about 1.600. As recognized by those skilled in the art, when measuring refractive indices of materials for purposes of comparison with the refractive indices of other materials, the measurements should be made at the same temperatures for comparability. For light transmitting polymeric materials the index of refraction is a unitless value which may be determined according to ASTM Designation D 542-90. The refractive index of the copolycarbonate component (a) decreases from the value associated with a pure BHPF polycarbonate to the value associated with a polysulfone as the BHPF content of the copolycarbonate decreases by incorporation of a second, "refractive-index-lowering", aromatic moiety such as by copolymerization with Bisphenol-A or incorporation of a Bisphenol-A carbonate polymer, component (c).

Therefore, in the blends according to the invention, when containing an aryl fluorene carbonate polymer (a) alone or a blend of an aryl fluorene carbonate polymer (a) and a carbonate polymer (c) based on another aromatic moiety, for example Bisphenol-A, the mole ratio of the diaryl fluorene moieties in the copolycarbonate or blend will determine the refractive index. In order to provide transparent blends according to the present invention, the refractive indices of the combination of components (a) and (c), if (c) is used, and the component (b) polysulfone should be within about 0.02 unit of each other, preferably within about 0.01, more preferably within about 0.005 and most preferably within about 0.001.

In the case of preparing these preferred transparent blends, the mole ratio of diaryl fluorene moieties to Bisphenol-A or other non-fluorene aromatic moieties in the copolycarbonate or polycarbonate blend needs to be selected to approximately match the refractive index of the polysulfone component. In general, it has been found that the mole ratio of fluorene to non-fluorene aromatic moieties in the combination of (a) and (c) needs to be at least about 0.3:1, preferably at least about 0.5:1, and more preferably at least about 0.9:1. Preferably the mole ratio of diaryl fluorene moieties to Bisphenol-A or other non-fluorene aromatic moieties in the copolycarbonate or polycarbonate blend is less than about 1.5:1, preferably less than about 1.4:1, more preferably less than about 1.3:1, and more preferably less than about 1.2:1.

For example, for a typical bisphenol A based polysulfone such as commercially available UDEL brand polysulfone from Amoco, there would need to be from about 40 to about 100 mole percent diaryl fluorene moieties, preferably from about 50 to about 95 mole percent diaryl fluorene moieties and most preferably from about 60 to about 90 mole percent diaryl fluorene moieties, based on moles of aryl fluorene and non-fluorene (preferably bisphenol A) moiety in the combination of (a) and (c).

In the case of a typical polyether polysulfone such as commercially available ULTRASON E brand polysulfone from BASF, there would need to be at least about 75 mole percent diaryl fluorene moieties, preferably at least about 80 mole percent diaryl fluorene moieties and most preferably at least about 90 mole percent diaryl fluorene moieties, based on moles of aryl fluorene and non-fluorene (preferably bisphenol A) moiety in the combination of (a) and (c).

In providing preferred transparent blends according to the present invention, component (a) is preferably a copolycarbonate based on BHPF and Bisphenol-A. In another preferred aspect, an optional carbonate polymer (c) is added, which optional carbonate polymer is based on another aromatic moiety, preferably Bisphenol-A.

It is desirable to maintain the heat resistance of the resins according to the present invention as high as possible. As used herein, heat resistance is the heat deflection temperature under load ("DTUL") measured according to ASTM D648. In general, for sterilizable medical applications it is preferred to maintain the DTUL of the blends above 132° C. (270° F.), preferably above 140° C. (289° F.), more preferably above 150° C. (302° F.) and most preferably above 170° C. (338° F.).

It has been found that the use of the polysulfone, even at very low levels, surprisingly provides the claimed diaryl fluorene carbonate polymer blends with good hydrolytic stability. It is desirable to maintain the hydrolytic stability of the resins according to the present invention as high as possible. As used herein, hydrolytic stability is established or determined by the retention of tensile strength after a number of cycles heat treatments in an autoclave, representing multiple sterilizations of medical equipment. In general, it is desired to maintain at least 80%, preferably at least 85% of the tensile strength after 100 cycles through an autoclave, preferably 250 cycles, as compared to measured tensile strength of the starting material. This evaluation involves a series of autoclave treatment cycles, a single 13 minute autoclave treatment cycle involving heating the sample for 3 minutes in steam at temperature of 270° F. and a pressure of 30 pounds per square inch gauge ("psig") (132° C., 0.21 MPa) to a temperature of 270° F, maintaining this autoclave chamber temperature and pressure for 5 minutes, followed by 5 minutes depressurizing while the sample cools somewhat prior to the next steam heating cycle.

A variety of additives may be advantageously employed to promote flame retardance or ignition resistance in the compositions of this invention, or as antimicrobial agents; antioxidants; antistatic agents; fillers and reinforcing agents; hydrolytic stabilizers; stabilizers against basic impurities; lubricants; mold release agents; pigments, dyes and colorants; plasticizers; heat stabilizers; ultraviolet light stabilizers. Preferred hindered phenolic antioxidants are Irganox™ 1076 and Irganox™ 1010 antioxidants, available from Ciba-Geigy Corp. Such additives, if used, typically do not exceed 45 percent by weight of the total composition, and are advantageously from about 0.001 to 15 percent, preferably from about 0.01 to 10 percent and more preferably from about 0.1 to 10 percent, by weight of the total composition.

When softened or melted by the application of heat, the compositions of this invention are useful for fabrication and can thereby be formed, shaped or molded using conventional techniques such as compression molding, injection molding, gas assisted injection molding, calendering, vacuum forming, thermoforming, extrusion and/or blow molding techniques, alone or in combination. The compositions can also be formed, spun or drawn into films, fibers, multi-layer laminates or extruded sheets, or can be compounded with one or more organic or inorganic additives, on any machine suitable for such purpose.

The compositions of this invention are useful, for example, in the production of films, fibers, extruded sheets, multi-layer laminates and molded or shaped articles of virtually all varieties, especially the injection molding of a range of shaped articles including sterilizable medical articles, data storage apparatus and media, appliance and instrument housings, motor vehicle body panels and other parts and components for use in the automotive, electrical and electronics industries.

Preparation of the compositions of this invention can be accomplished by any suitable mixing means known in the art. Typically the polycarbonate and polysulfone, and any optional components or additives, are dry blended in a tumbler or shaker in powder or particulate form with sufficient agitation to obtain thorough distribution. Materials of these types typically need to be thoroughly dried prior to high temperature heat plastication and suitable drying techniques are well known. Alternatively, the component materials can be extrusion mixed under vacuum to remove water vapor.

If desired, the dry-blended formulation can be further subjected to melt mixing under shearing stresses at a temperature sufficient to cause heat plastification, for example in an extruder with or without a vacuum at temperatures in the range of from about 280° to about 400° C., preferably from about 290° to about 350° C. Other apparatus which can be used in the mixing process include, for example, a roller mill, a Henschel mixer, a ribbon blender, a Banbury mixer, or a reciprocating screw injection molding machine. Any additional optional components may be mixed simultaneously or later, in any sequence. After mixing, the compositions may be recovered in the form of a pellet, powder or flake. During extrusion of the blend strands, it may be necessary to use techniques such as die face cutters or under water cutting to reduce problems due to surging of the material and breakage of the strands due to low melt strength. It may be desired to prepare the pellets of the blend composition (and/or fluorene or sulfone polymer components) by extrusion under nitrogen or other means to exclude oxygen to avoid molecular weight degradation and coloration.

Experiments

The component (a) aryl fluorene carbonate polymer used in the following experiments is a copolycarbonate of 9,9-bis(4-hydroxyphenyl) fluorene ("BHPF"), 2,2-bis(4-hydroxyphenyl) propane ("Bisphenol-A") and phosgene as the polycarbonate precursor, having a BHPF to Bisphenol-A mole ratio of 60:40, a weight average molecular weight of about 27,000, a melt flow rate of 3.0 grams per 10 minutes at 310° C. and 12.5 kg and a solution viscosity value of 0.36 deciliter per gram as a 0.5 gram per deciliter (gr/dl) solution in methylene chloride at 25° C. This resin has a refractive index of 1.627 as measured at 23° C.

The component (b1) polysulfone used in the following experiments is a bis-phenol A type polysulfone commercially available as Udel P1700 brand polysulfone from Amoco and having repeating units generally represented by the structure:

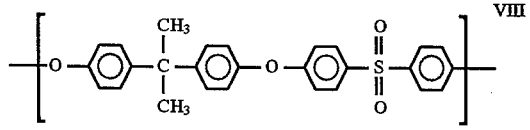

and having a weight average molecular weight of about 58,000 and a melt flow rate of 6.5 grams per 10 minutes (ASTM 1238, 343C, 8.7 kg). This resin has a refractive index of approximately 1.633 as measured at 23° C.

The blend components (a) and (b1) were dry blended in the indicated ratios and dried in an oven overnight at 250° F. (121° C.). The dry blends were then introduced to the feed hopper of a twin screw extruder and compounded at about 300° to 340° C. and pelletized. It is noted that direct pelletization of the extrudate strands was not possible due to surging (non-uniform strand diameters) and breaking of the strands. Manual handling of the strands and feeding to the pelletizer was required.

The compounded blend pellets were dried overnight either in a forced air oven at 250° F. (121° C.) or in desiccant dryers at 220° F. (104° C.) and then injection molded into the appropriate test specimens using molding temperatures of about 700° F. (371° C.). It should be noted that the sample compositions prepared and reported in Tables 1 and 2 were prepared at different times and molded under slightly differing conditions which most likely accounts for the minor variations in the reported evaluation results for otherwise identical compositions.

The resulting blends were evaluated according to standard techniques for their optical and physical properties, and found to possess excellent combinations of properties.

With regard to the optical properties, the transparency of the claimed blend compositions was visually observed ("Transparent" or "Opaque"), the transmittance ("%T")was measured according to ASTM D 1003 and both are shown in the Tables below.

Instrumented Dart Impact testing ("Dart", ASTM D 3763) was performed on an MTS machine with a 0.5 inch diameter tup at a speed of 8,000 inches per minute (20,320 centimeters per minute) at 73° F. (23° C.) and –20° F. (–29° C.). In the Dart testing it was surprisingly found that the claimed blends exhibited desirable ductile failure mechanisms as opposed to less desirable brittle failure behavior that is observed in the diaryl carbonate polymer. The results of the Dart test are shown below in inch pounds (in-lb) and Joules (J) along with the visually observed ductile/brittle behavior of the samples. The samples were considered ductile when yielding of the sample was evident during the Dart impact testing and the sample did not shatter or break into a number of pieces. The samples were considered brittle if the sample broke into pieces without yielding during the dart testing. This data shows that the incorporation of the polysulfone into the diaryl fluorene carbonate polymer results in ductile failure behavior as opposed to the normally brittle failure behavior of these polymers.

The tensile properties were determined according to ASTM D 638 on an United Tensile machine at a crosshead speed of two inches per minute. The samples used were 6 ½"×½"×⅛" (165.1 mm×12.7 mm×3.2 mm) dogbone-shaped bars. The results are reported in pounds per square inch (psi) and megaPascals (Mpa). In the tensile testing, the ductility of the claimed blends was also evidenced by the good elongation at break ("% Elong") values and tensile strength ("Tens. Strength") values.

The heat resistance properties of the blends are measured as the Deflection Temperature Under Load ("DTUL") according to ASTM D 648 at loads of 66 pounds per square inch pressure ("psi") (0.46 mega Pascals, "MPa") and 264 psi (1.82 MPa) and are shown below in °F. and °C. As can be seen, the heat resistance shows improvement with increasing levels of diaryl fluorene carbonate polymer.

The hydrolytic stability of the claimed blends is shown below by good retention of the tensile strength properties after a series of treatments in an autoclave that simulates the sterilization treatment that medical devices are typically exposed to. In the autoclave testing, a 13 minute autoclave treatment cycle involves heating the sample for 3 minutes in steam at temperature of 270° F. and a pressure of 30 pounds per square inch gauge ("psig") (132° C., 0.21 MPa) to a temperature of 270° F. (132° C.), maintaining this autoclave chamber temperature and pressure for 5 minutes, followed by 5 minutes depressurizing while the sample cools somewhat prior to the next steam heating cycle.

TABLE 1

| | Sample No. | | | | | |
|---|---|---|---|---|---|---|
| | 1* | 2 | 3 | 4 | 5 | 6* |
| Diaryl Fluorene Carbonate Polymer | 100 | 70 | 65 | 60 | 50 | 0 |
| Polysulfone b1 | 0 | 30 | 35 | 40 | 50 | 100 |
| Transparency | Yes | Yes | Yes | Yes | Yes | Yes |
| DTUL (66 psi; 0.46 Mpa) | 424° F. 218° C. | 413° F. 212° C. | 414° F. 212° C. | 419° F. 215° C. | 403° F. 206° C. | 358° F. 181° C. |
| DTUL (264 psi; 1.82 Mpa) | 402° F. 206° C. | | | 375° F. 191° C. | 362° F. 183° C. | 345° F. 174° C. |
| Dart: −20 F., in-lb (J) | 28 (3) | 23 (3) | 43 (5) | 105 (12) | 125 (14) | 290** (33) |
| Dart: 73 F., in-lb (J) | 469 (53) | 162 (18) | 198 (22) | 268 (30) | 453 (51) | 581** (66) |
| Room Temp Ductile/brittle behavior | brittle | ductile | ductile | ductile | ductile | ductile |

*Comparative Experiment, not an example of the present invention
**Calculated based on manufacturers reported tensile and Izod impact data

TABLE 2

| | Sample No. | | | | |
|---|---|---|---|---|---|
| | 7* | 8 | 9 | 10 | 11* |
| Diaryl Fluorene Carbonate Polymer | 0 | 20 | 40 | 60 | 100 |
| Polysulfone b1 | 100 | 80 | 60 | 40 | 0 |
| Optical properties % T | 85 | 78 | 82 | 77 | 81 |
| Transparency | yes | yes | yes | yes | yes |
| % Elong | 130 | 60 | 106 | 33 | 12 |
| Dart: 73 F., in-lb (J) | 620 (70) | 510 (58) | 550 (62) | 530 (60) | 380 (43) |
| Room Temp Ductile/brittle behavior | Ductile | Ductile | Ductile | Ductile | Brittle |
| Hydrolytic Stability (% Retention of Tensile Strength) | | | | | |
| 50 Autoclave Cycles | 100 | 100 | 100 | 100 | 93 |
| 100 Autoclave Cycles | 100 | 89 | 100 | 100 | 60 |
| 250 Autoclave Cycles | 100 | 100 | 100 | 100 | 70 |

*Comparative Experiment, not an example of the present invention

TABLE 3

| | Control/Sample No. | | | |
|---|---|---|---|---|
| | 12* | 13* | 14* | 15* |
| Non Fluorene Polycarbonate | 100 | 60 | 20 | |
| Polysulfone b1 | | 40 | 80 | 100 |
| Optical properties % T | | 21 | 19 | |
| Transparency | Transparent | Opaque | Opaque | Transparent |
| Ductile/brittle behavior | Ductile | Ductile | Ductile | Ductile |
| % Elong | 150 | 145 | 148 | 130 |
| Dart: 73 F., in-lb (J) | 770 (87) | 663 (75) | 595 (67) | 620 (70) |
| Hydrolytic Stability (% Retention of Tensile Strength) | | | | |
| 50 Autoclave Cycles | 100 | 83 | 83 | 100 |
| 250 Autoclave Cycles | 16 | 81 | 95 | 100 |

*Comparative Experiment, not an example of the present invention

The component (b2) polysulfone used in the following experiments is a polyether polysulfone commercially available as VICTREX 600 brand polyethersulfone from ICI and having repeating units generally represented by the structure:

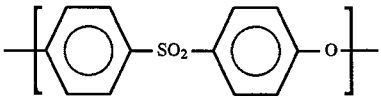

This polyether sulfone had a weight average molecular weight of about 60,000, a melt flow rate (reported by supplier as "MVI") of 30 cubic centimeters per 10 minutes (ASTM 1238, 360° C., 10 kg) and a refractive index of approximately 1.651 as measured at 23° C.

The blend components (a) and (b2) were dry blended in the indicated ratios after being dried in a forced air dryer overnight at 150° C. The dry blends were then introduced directly to the feed hopper of an injection molding machine (Arburg 150) and mixed at a temperature of about 680° F. (360° C.) and injection molded into the appropriate test specimens using a mold temperature of about 200° F. (93° C.).

The tensile properties were determined according to ASTM D 638 on an Instron 1125 ROBOT tensile testing machine and the data was analyzed with a microcomputer running Instron Series IX software. The crosshead speed was 0.2 inches per minute using a 2000 pound (lb) (907.2 kilogram—"kg") load cell and the load was measured 9 times per second at a temperature of 73° C. at 50% relative humidity. The samples used were 6 ½"×½"×⅛" (165.1 mm×12.7 mm×3.2 mm) dogbone-shaped bars. The results are reported in pounds per square inch (psi) and megaPascals (Mpa). In the tensile testing, the ductility of the claimed blends was also evidenced by the good elongation at break ("% Elong") values and tensile strength ("Tens. Strength") values.

The notched Izod impact resistance ("N. Izod") is tested at room temperature according to ASTM D-256-72A on 3.2 millimeter (⅛ inch) samples that have been injection molded at 307° C. The results are given in Joules per meter (J/m) and foot pounds per inch (ft lb/in). In the testing it was found that the claimed blends exhibited desirable ductile failure mechanisms as opposed to less desirable brittle failure behavior that is observed in the diaryl carbonate polymer. The samples were considered ductile when yielding of the sample was evident during the testing and the sample did not shatter or break into a number of pieces. The samples were considered brittle if the sample broke into pieces without yielding during the testing. This data shows that the incorporation of the polysulfone into the diaryl fluorene carbonate polymer results in ductile failure behavior as opposed to the normally brittle failure behavior of these polymers.

TABLE 4

| | Control/Sample No. | | | |
|---|---|---|---|---|
| | 16* | 17 | 18 | 19* |
| Diaryl Fluorene Polycarbonate | 100 | 75 | 50 | |
| Polysulfone b2 (polyether polysulfone) | | 40 | 80 | 100 |
| Optical properties % T Transparency | Transparent | Opaque | Opaque | Transparent |
| Ductile/brittle behavior | Brittle | Ductile | Ductile | Ductile |
| % Elong | 15 | 15 | 23 | 64 |
| Modulus, psi (MPa) | 317,000 (2185) | 398,000 (2744) | 399,000 (2750) | 390,000 (2689) |
| Tens. Strength, psi (MPa) | 9,300 (64) | 9,750 (67) | 9,650 (67) | 9,900 (68) |
| N. Izod, ft. lbs./in. (J/m) | 1.6 (85) | 1.4 (75) | 1.81 (97) | 1.55 (83) |
| DTUL; °C. (66 psi; 0.46 Mpa) | 220 | 210.5 | 208 | 195 |

*Comparative Experiment, not an example of the present invention

What is claimed is:

1. A polymer blend composition comprising, in admixture, (a) a diaryl fluorene carbonate polymer and (b) a polysulfone comprising repeating units according to the formula $$\text{\textelp}(Ar(E)_4-SO_2-Ar(E)_4-O)\text{\textelp}(Ar(E)_4-D-Ar(E)_4)_m O)_n O)_p$$

wherein Ar is a 6 to 20 carbon divalent aromatic radical; D is a single bond or a divalent hydrocarbyl radical composed of 1–10 carbon atoms, each E is independently hydrogen, a halogen, a $C_1$–$C_8$ alkyl, alkaryl, aralkyl, or aryl radical; m is 0 or 1; n is from 0 to about 3, and p is from about 1 to about 500, which polysulfone is different from the carbonate polymer (a) and does not contain carbonate moieties.

2. A composition according to claim 1 comprising (c) a second non-fluorene aromatic carbonate polymer prepared from a dihydroxy aryl compound.

3. A composition according to claim 1 wherein the diaryl fluorene carbonate polymer (a) is a copolymer prepared from a diaryl fluorene compound and a non-fluorene dihydroxy aryl compound.

4. A composition according to claim 3 comprising (c) a second non-fluorene aromatic carbonate polymer prepared from a non-fluorene dihydroxy aryl compound.

5. A composition according to claims 3 or 4 wherein the ratio of moles of diaryl fluorene in the diaryl fluorene carbonate polymer (a) per mole of non-fluorene dihydroxy aryl compound in carbonate polymer component (a) plus optional (c) in the composition is about 0.1:1 to about 100:1.

6. A composition according to claims 3 or 4 wherein the ratio of moles of diaryl fluorene in the diaryl fluorene carbonate polymer (a) per mole of non-fluorene dihydroxy aryl compound in carbonate polymer component (a) plus optional (c) in the composition is about 0.5:1 to about 10:1.

7. A composition according to claims 3 or 4 wherein the ratio of moles of diaryl fluorene in the diaryl fluorene carbonate polymer (a) per mole of non-fluorene dihydroxy aryl compound in carbonate polymer component (a) plus optional (c) in the composition is about 0.8:1 to about 3:1.

8. A composition according to claims 3 or 4 wherein the diaryl fluorene compound used in the preparation of the diaryl fluorene carbonate polymer is represented by the structure generally as follows:

$$\text{Structure I}$$

wherein $R_1$, $R_2$, $R_3$ and $R_4$ independently in each occurrence are hydrogen, a 1 to 6 carbon, linear, branched or cyclic alkyl, haloalkyl, alkoxy, aryl or aryloxy radical, or a halogen and $R_5$ is a divalent alkyl, haloalkyl, alkoxy, aryl or aryloxy radical comprising 1 to 12 carbon atoms, preferably 1 to 6 carbon atoms or a single bond.

9. A composition according to claims 3 or 4 wherein the non-fluorene dihydroxy aryl compound used is represented by the structure generally as follows $$\text{Structure IV}$$

wherein D is (a) a linear saturated aliphatic divalent radical of 1 to 5 carbon atoms; each E is independently hydrogen, halogen, or a linear $C_1$–$C_{12}$ alkyl radical and m is 0 or 1.

10. A composition according to claims 3 or 4 comprising from about 1 to about 99 parts by weight carbonate polymer component(s) (a) plus optional (c) and from about 1 to about 99 parts by weight polysulfone (b), with respect to 100 total parts by weight of these components.

11. A composition according to claim 10 wherein the carbonate polymer component comprises from about 50 to about 99 weight parts diaryl fluorene carbonate polymer (a) and from about 1 to about 50 weight parts non-fluorene aromatic carbonate polymer (c) based on 100 weight parts (a) plus (c).

12. A composition according to claims 3 or 4 which is transparent.

13. A composition according to claim 1 wherein

—Ar(E)$_4$—SO$_2$—Ar(E)$_4$—O—  VI in the above formula represents a remnant of a 4,4'-dihalodiphenyl sulfone or a sulfone-bridged bisphenol.

14. A composition according to claim 1 wherein the polysulfone has repeat units according to the formula:

$$\text{Structure VIII}$$

15. A composition according to claim 1 wherein the polysulfone has repeat units according to the formula:

$$\text{Structure IX}$$

16. A composition according to claim 13 wherein Ar in each occurrence is phenylene, E is a hydrogen radical in each occurrence, D is a 2,2-isopropylidene radical and m is 1.

* * * * *